United States Patent Office 3,141,227
Patented July 21, 1964

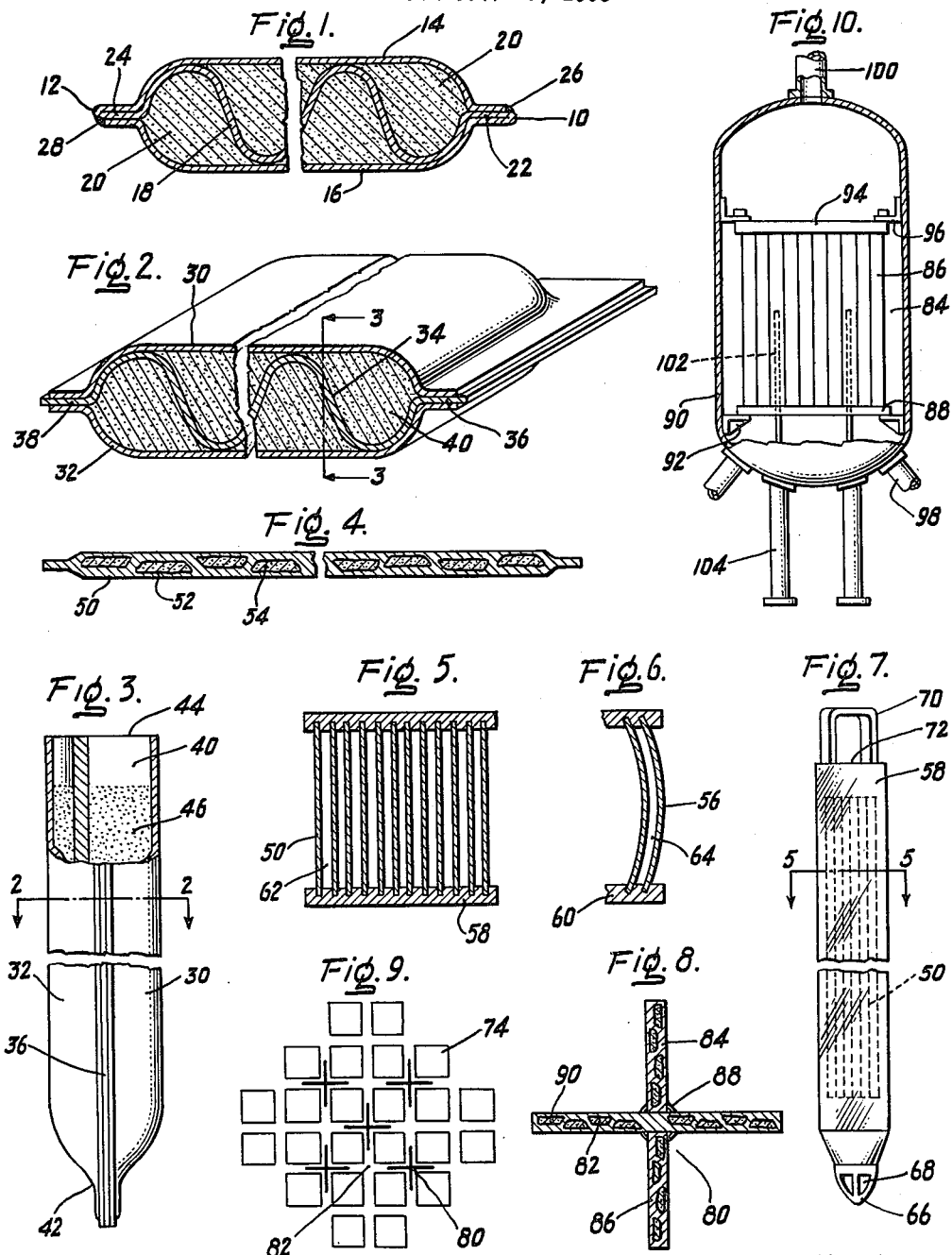

3,141,227
METHOD OF NUCLEAR FUEL AND CONTROL
ELEMENT FABRICATION
Harold H. Klepfer, Pleasanton, and Morris J. Sanderson,
Santa Clara, Calif., assignors to General Electric Company, a corporation of New York
Filed Oct. 20, 1958, Ser. No. 768,471
8 Claims. (Cl. 29—471.5)

This invention relates broadly to the conversion of mass to energy in nuclear reactors, and more specifically relates to a method for fabricating an improved and more economical fuel and control rod structure of improved heat transfer and nuclear reaction product retention characteristics for use in such reactors.

The release of large amounts of energy through nuclear fission reactions is now quite well known. In general, a fissionable atom such as $U^{233}$, $U^{235}$, or $Pu^{239}$ absorbs a neutron in its nucleus and undergoes a nuclear disintegration. This produces, on the average, two fission products of lower atomic weight and great kinetic energy, and from two to three neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches about 200 mev. (million electron volts) per fission.

The kinetic energy of the fission products is quickly dissipated as heat in the fissionable fuel. If after this heat generation there is at least one net neutron remaining which induces a subsequent fission, the fission reaction becomes self-sustaining and the heat generation is continuous. The heat is removed by recirculating a coolant through heat exchange relationship with the fuel and a heat sink. The reaction may be continued as long as sufficient fissionable material remains in the fuel to override the effects of the fission products and other neutron absorbers which also may be present.

In order to maintain such fission reactions at a rate sufficient to generate useful quantities of thermal energy, nuclear reactors are presently being designed, constructed, and operated in which the fissionable material or nuclear fuel is contained in fuel elements which may have various shapes, such as plates, tubes, or rods. These fuel elements are usually provided on their external surfaces with a corrosion-resistant non-reactive cladding which contains no fissionable or fertile material. The fuel elements are grouped together at fixed distances from each other in a coolant flow channel or region as a fuel assembly, and sufficient fuel assemblies are combined to form the nuclear reactor core capable of the self-sustained fission reaction referred to above. The core is enclosed within a reactor vessel in which a coolant is circulated.

The cladding serves two primary purposes. It resists any chemical reaction between the nuclear fuel and either the coolant or moderator if present, or both. It prevents the highly radioactive fission products, some of which are gaseous, from being released into the coolant or moderator. Common cladding materials are stainless steel, aluminum and its alloys, magnesium and its alloys, zirconium and its alloys, and others. The failure of the cladding can contaminate the coolant or moderator and the associated system with intensely radioactive long-lived products to a degree which interferes with plant operation. Because of the relatively large amounts of heat released in small volumes and because of the gaseous fission products generated, the fuel structure desirably has excellent heat transfer and internal gas pressure resistance characteristics.

Nuclear reactors customarily contain a core made up of a lattice of such fuel elements. In order to control the nuclear reactions, provision is made for insertion into the core of a control element containing material which constitutes a nuclear reaction poison. These materials are well known in general and include elements or compounds of elements having large neutron capture cross-sections but which do not undergo nuclear fission. Neutron absorption in such materials reduces the neutron flux in its vicinity and also may generate considerable heat and gas products. For example, nonfission capture of a neutron in boron generates helium and releases energy as a gamma radiation according to the following reaction:

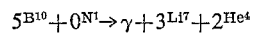

$$_5B^{10} + _0N^1 \rightarrow \gamma + _3Li^7 + _2He^4$$

Therefore, heat transfer and pressure rise problems are encountered in the control element structures as well as in the fuel of a nuclear reactor.

It is accordingly an object of this invention to provide an improved method for fabricating a nuclear core element structure containing active nuclear material and which has substantially improved heat transfer and gas retention properties.

Another object of this invention is to provide an improved method for fabricating a curved or flat plate type nuclear reactor fuel element in which the nuclear fuel is disposed in elongated channels of irregular but generally rectangular cross-section.

An additional object of this invention is to provide an improved method for fabricating a nuclear reactor control element of the blade type in which the nuclear reaction poison is contained within the blade in elongated channels of irregular but generally rectangular cross-section.

It is a further object of this invention to provide an improved method for fabricating fuel and control elements for use in nuclear reactors adapted to liberate energy by neutron-induced nuclear fission of fissile atoms, and in which elements the fuel or control poison is contained in elongated channels disposed parallel to and closely spaced apart from the heat transfer surfaces of the element to provide excellent heat transfer characteristics, the geometric cross-section of the channel being such to enable the channel to resist internal effects of gas generation.

Other objects and advantages of this invention will become apparent to those skilled in the art as the description and illustration thereof proceed.

Briefly, the present invention comprises an improved method for fabricating an elongated flat or curved plate-type nuclear reactor core structure containing either fissionable or fertile atoms in elemental or compound form for use as a nuclear fuel element, or containing material having a large neutron absorption cross-section and which acts as a nuclear reaction poison for use as a control element in a nuclear reactor, or both. These elements are produced, according to the method of this invention, by the application of metal rolling mill techniques on a particular billet structure to produce an elongated element having sealed ribbon-shaped channels containing the compacted solid or semi-solid nuclear fuel or control poison material. These channels extend in a direction parallel to the rolling direction and parallel to the longitudinal axis of the element. The channels are of irregular but generally rectangular cross-section with the major axis of the cross-section lying parallel to the principal surfaces of the element. In this manner, very low resistance to heat transfer from the material in each channel through the plate surface and into the ambient coolant and improved resistance to pressure rises in the sealed channels are achieved.

The structures, methods, and the materials applicable in the practice of the present invention will be more readily understood by reference to the following description of the accompanying drawings, in which:

FIGURE 1 is a transverse cross-section view of the preliminary or unrolled billet structure from which the improved nuclear reactor core elements of this invention are produced by rolling mill techniques;

FIGURE 2 is a combined transverse section and perspective view of a modified structure analogous to the one shown in FIGURE 1;

FIGURE 3 is a longitudinal edgewise view in partial cross-section of the billet structure shown in FIGURE 2 and illustrates the condition of the structure prior to sealing the end of the internal channels through which they are filled;

FIGURE 4 is a transverse cross-section view of the finished nuclear reactor core element of this invention after rolling and compacting either of the structures illustrated in FIGURE 1 or 2;

FIGURES 5 and 6 illustrate transverse section views of flat plate and curved plate type fuel element assemblies respectively, using rolled fuel elements fabricated according to this invention;

FIGURE 7 is a longitudinal view of a nuclear fuel plate assembly, the cross-section of which corresponds to either FIGURE 5 or FIGURE 6;

FIGURE 8 is a transverse section view of an elongated blade-type control element of cruciform cross-section containing nuclear poison and fabricated from rolled elements according to this invention;

FIGURE 9 is a schematic cross-section view illustrating a nuclear reactor core having a lattice of fuel assemblies and control elements of the types shown in FIGURES 7 and 8; and FIGURE 10 is a schematic elevation view in partial cross-section of a nuclear reactor in which the devices fabricated according to this invention may be utilized.

The description of FIGURES 1 through 4 will be conducted in terms of a specific example of the present invention as applied to the manufacture of a stainless steel clad uranium dioxide ($UO_2$)-containing fuel element whose finished dimensions are approximately 3.5 inches in width, 36 inches in length, and 0.200 inch in thickness.

Referring now particularly to FIGURE 1, a cross-section view of the preliminary or billet structure of this invention is shown which, in this embodiment, is made up of a single strip of stainless steel originally about 9 inches in width, 20.0 inches in length, and about 0.100 inch in thickness. This strip has been rolled in an appropriate rolling mill to form therein a pair of spaced U-shaped channels facing opposite directions and having a corrugated region therebetween. This strip is folded sharply along longitudinal lines corresponding to folds 10 and 12 to produce the billet structure about 3.0 inches wide and comprising first clad channel 14, second clad channel 16 facing channel 14, and internal corrugated member 18 enclosed therebetween. As indicated in FIGURE 1, this billet contains a plurality of longitudinal internal channels 20 which exist between the individual corrugations of member 18 and the adjacent internal surface of either of the generally U-shaped clad channels 14 or 16. The corrugated member has a serpentine or generally sinusoidal cross-section.

The folds along edges 10 and 12 form a pair of lips or flanges 22 and 24 extending along each edge of the billet. These flanges may be sealed, prior to filling internal channels 20 with the nuclear fuel or control poison, by means of welds 26 and 28. Alternatively, this billet may be rolled so as to compress and bond together the three layers of metal existing in flanges 22 and 24. As a further alternative, this step of roll-bonding may be conducted after the internal channels 20 have been filled and either prior to or simultaneously with the first pass of the filled billet through the subsequent rolling and compacting steps.

In FIGURE 2, a cross-section perspective view of another embodiment of the billet of this invention is shown in which the two separate clad channel elements are enclosed around the corrugated element. Three individual strips of stainless steel each about 3.0 inches wide are employed to produce the structure shown. Individual clad channels 30 and 32 enclose corrugated strip 34, their longitudinal edges intersecting to form flanges 36 and 38. These flanges may be bonded together by any of the several welding or rolling techniques previously described. Internal channels 40 are formed in the billet and correspond with channels 20 in the structure shown in FIGURE 1.

Referring now to FIGURE 3, an edgewise longitudinal view in partial cross-section, taken in the direction indicated in FIGURE 2, shows clad channels 30 and 32, flange 36, and internal channels 40. One end of the structure, indicated generally at 42, is closed by such means as stamping or forging to leave each internal channel 40 open only at one end designated as 44. Powdered $UO_2$ fuel, having an enrichment of 20 percent $U^{235}$, is introduced to provide a body of fuel 46 in each internal channel. The added powder may be preliminarily compacted by vibrational or other techniques and then the open ends 44 are closed in any convenient manner. The resultant structure is a pillow-shaped billet having the approximate dimensions referred to above, sealed at each end and at the flanges extending along each edge, and containing a plurality of parallel individual $UO_2$-filled internal channels as indicated in FIGURES 1 and 2.

The subsequent processing of this billet follows rolling mill techniques and with the stainless steel structural or clad material of this example, warm or hot rolling of the billet is suitable. The billet is passed successively through the various stands of a rolling mill and subjected to successive thickness reductions to compact and densify the $UO_2$ fuel powder. During this rolling procedure, the flanges are also successively reduced in thickness by the mill rolls so as to maintain the integrity of the longitudinal flange bond. With the billet described in this example, approximately ten passes are required to produce the desired fuel plate thickness.

Referring now to FIGURE 4, an enlarged cross-section view of finished fuel plate 50 is shown. This fuel plate contains a plurality of elongated ribbon-like internal channels 52 of irregular but generally rectangular cross-section disposed with their major or width axes parallel to the principal heat transfer surfaces of the finished fuel plate 50. Each channel contains a highly densified mass 54 of $UO_2$ fuel. These ribbon-like channels of fuel are disposed with their pricipal or width surfaces parallel to and closely spaced apart from the principal heat transfer surface of the fuel plate and thus resistance to heat flow from the channel through the clad metal is very low. Further, because of the particular geometric shape and size of the channel cross-section, each channel is able to withstand the internal pressure which may be developed during irradiation due to the accumulation of gaseous irradiation products.

In FIGURES 5 and 6, cross-section views of typical flat and curved plate nuclear fuel element assemblies respectively are shown. In each of these figures, fuel plates 50 and 56 are rigidly secured at their edges between side plates 58 and 60 respectively, leaving open channels 62 and 64 therebetween for the passage of coolant or moderator, or both. The attachment between the fuel plate edges and the side plates may be by welding, brazing, or other suitable mechanical means.

In FIGURE 7 is shown a lonigtudinal view of a fuel element corresponding to the cross-section shown in FIGURE 5, for example. One side plate 58 is shown and fuel plates 50 secured therebetween are also indicated generally. This assembly is provided with a lower nose piece 66 having fluid orifices 68, and with a lifting bail 70 provided at the upper open end 72 of the assembly. Coolant may flow in either direction through the assembly.

As indicated previously, the same techniques described above for the production of an aluminum-clad, $UO_2$-containing nuclear fuel plate can be applied in the production of plate-type control elements for nuclear reactor control. The only change of significance is the substitution of a nuclear poison for the nuclear fuel described in connection with FIGURES 1 through 4.

Referring now to FIGURE 8, a transverse section view of such a blade-type control element 80 of cruciform cross-section is shown. This control element is fabricated from 0.375 inch thick east-west plate section 82, 7.5 inches wide and a pair of 0.375 inch thick north-south plate sections 84 and 86 each 3.56 inches wide welded at 88 at right angles along the center line on each side of the east-west plate section. The plates are stainless steel. Each of these plates contains a plurality of internal channels 90 filled with a nuclear poison. Heat generated in the nuclear poison, during radiative capture therein of a neutron, is transferred readily into the ambient coolant by virtue of the parallelism and close spacing of poison channel 90 with the heat transfer surface of the control element. Further, the channel structure readily resists the rise in internal pressures expected due to the predicted buildup of gaseous products in the poison.

In FIGURE 9 is illustrated a schematic cross-section view of a nuclear reactor core made up of a plurality of parallel fuel element assemblies 74 of square cross-section and of the type indicated in FIGURES 5 and 7, and control elements 80 of cruciform cross-section, as indicated in FIGURE 8. These individual elements are located together in fixed positions providing channels 82 therebetween, through which additional moderator or coolant may be circulated and in which control elements 80 may be moved.

Referring finally to FIGURE 10, a schematic elevation view of a nuclear reactor is shown in which the nuclear fuel and control poison elements fabricated through the practice of this invention may be used. A nuclear reactor core 84 is made up of a plurality of parallel fuel assemblies 86, each containing the plate-type fuel according to this invention. These fuel assemblies are supported on lower support grid or plate 88, which in turn is secured to the wall of reactor vessel 90 by means of brackets 92. The upper ends of the fuel assemblies are rigidly fixed in position by upper grid guide or hold-down plate 94, also secured to the wall of vessel 90 by means of brackets 96. Inlets 98 and outlet 100 are provided for the circulation through vessel 90 of a fluid moderator or coolant. Control elements 102 extend upward into core 84 as shown and are actuated by means of a control element drive assembly contained in drive housings 104.

The present invention has been described above in connection with stainless steel as the structural material. This is not to be construed as a limitation on the present invention since it may readily be applied using known rolling mill techinques to other metals such as aluminum, magnesium, nickel, zirconium, the various alloys of these metals, and the like.

The present invention also contemplates as structural materials the various metal-like products produced by compaction and sintering techniques applied to powders and to which various additives may have been incorporated. For example, powdered or flake aluminum may be mixed with up to about 10 percent of either silicon dioxide or nickel oxide and sintered at temperatures of incipient fusion to produce a sintered aluminum product having excellent corrosion resistance in boiling water up to temperatures of about 560° F. Similar products may be made from zirconium. Other materials which are not strictly metallic and not strictly alloys may also be used in connection with this invention.

Further, the particular rolling procedures involved in this invention may be effected with or without heating of the billet structure of this invention, and with either one-pass or multi-pass rolling. The selection of rolling conditions is largely dependent upon a consideration of the particular structural materials involved.

The active nuclear material contained in the reactor core elements of this invention, namely the nuclear fuel or control poison, may be a solid or a semi-solid material. The paste-type mixtures of a solid nuclear fuel or poison and a liquid heat transfer or other medium may be used in the structures of this invention. The active materials may be added in powdered form. Further, they may be inserted as relatively close-fitting extrusions into the internal channels present in the billet, extrusion dies being used having a cross-section which is geometrically identical to the cross-section of the various internal channels. It will be noted on reference to FIGURES 1 and 2 that all of the internal channels have one of only two geometric cross-sections, the two outermost channels immediately adjacent each flange being identical, and the intermediate channels being identical in cross-section. Therefore, in preparing extruded inserts for the preliminary structure of this invention, only two extrusion cross-sections are required.

Many nuclear fuels and poisons are available in powdered form, in which case the powder is introduced into the internal channels as a free flowing stream and vibrational or other compacting techniques may be applied simultaneously. One desirable procedure is to add such powders in increments and precompact them by introduction of a close-fitting die into the channels after the addition of each increment.

The present invention contemplates the use of nuclear fuels such as uranium, plutonium and thorium. The fuel may be in elemental metallic form, as mixtures or alloys with other materials, or as compounds of these elements including the oxides, carbides, silicides, nitrides, etc. This invention also contemplates the use of nuclear reaction poisons in elemental form, as in mixtures or as alloys with other materials, or as compounds. Typical nuclear poisons include boron, cadmium, gadolinium, dysprosium, europium, samarium, silver, usually employed as the metal or alloy or as the carbide or the oxide, whichever best satisfies the requirements of chemical stability in the particular reactor system in which it is applied.

The nuclear reactor core elements fabricated through the practice of this invention contain the active nuclear material at densities approaching 100 percent of theoretical. The actual densities are usually highest when the material is introduced into the billet as a slug; but with powdered materials, densities of about 85 percent of theoretical result from rolling the billet without preliminary compaction, and densities between 90 percent and 95 percent of theoretical result from rolling the billet following preliminary powder compaction in the billet channels.

In the specification and in the appended claims, the term "plate" as applied to the nuclear reactor core elements of this invention, is intended to include an elongated element whose thickness is small relative to its width and which is either flat or curved in the direction of its width.

A particular embodiment of this invention has been described in considerable detail by way of illustration. It should be understood that various other modifications and adaptations thereof may be made by those skilled in this particular art without departing from the spirit and scope of this invention as set forth in the following claims.

We claim:
1. A method for producing a nuclear reactor core element which comprises forming a billet having a pair of clad channels and a corrugated member therebetween, introducing a body of active nuclear material into the internal open channels adjacent said corrugated member, sealing said material in said billet, and subjecting said billet to thickness reduction to elongate said billet and said internal channels to produce said core element hav- ing internal ribbon-shaped channels of irregular but generally rectangular cross-section and which are parallel to the principal exterior surfaces of said element.

2. A method according to claim 1 wherein said active nuclear material comprises a nuclear fuel.

3. A method according to claim 1 wherein said active nuclear material comprises one having a large neutron absorption cross-section and which acts as a nuclear reaction poison.

4. A method for producing a nuclear reactor core element which comprises forming a billet having a pair of U-shaped clad channels facing each other forming an elongated open space therebetween and having a corrugated member in said space, said billet thus having a plurality of longitudinal internal channels between the folds of said corrugated member and said clad channels, sealing one end of said internal channels, introducing into said internal channels a body of active nuclear material, sealing the other end of said internal channels, and then rolling said billet to form an elongated plate of reduced thickness and containing a plurality of sealed internal ribbon-shaped channels with irregular but generally rectangular cross-sections and disposed parallel to and closely spaced apart from the principal surfaces of said plate to provide very low resistance to heat transfer from said active material and to resist pressure rises in said internal channels.

5. A method according to claim 4 wherein said billet is formed by rolling a strip of structural material to form therein a pair of spaced U-shaped channels facing opposite directions and with a corrugated region therebetween, and folding said strip longitudinally to enclose the corrugated region between said channels.

6. A method according to claim 4 wherein said billet is formed by enclosing a pair of separate U-shaped channels around a separate corrugated member.

7. A method for producing a plate type nuclear reactor fuel element which comprises forming a billet having a pair of U-shaped clad channels and a corrugated member in the space therebetween, said billet thus having a plurality of longitudinal internal channels between the folds of said corrugated member and said clad channels, sealing one end of said internal channels, introducing into said internal channels a body of nuclear fuel, sealing the other end of said internal channels, and then rolling said billet to form an elongated plate of reduced thickness and containing a plurality of sealed internal channels with irregular but generally rectangular cross-sections and disposed parallel to and closely spaced apart from the principal surfaces of said plate to provide very low resistance to heat transfer from said fuel and to resist pressure rises in said internal channels.

8. A method for producing a blade-type nuclear reactor control element which comprises forming a billet having a pair of U-shaped clad channels and a corrugated member in the space therebetween, said billet thus having a plurality of longitudinal internal channels between the folds of said corrugated member and said clad channels, sealing one end of said internal channels, introducing into said internal channels a material having a large neutron absorption cross-section and which acts as a nuclear reaction poison, sealing the other end of said internal channels and then rolling said billet to form an elongated plate of reduced thickness and containing a plurality of sealed internal channels with irregular but generally rectangular cross-sections and disposed parallel to and closely spaced apart from the principal surfaces of said plate to provide very low resistance to heat transfer from said body of poison and to resist pressure rises in said internal channels.

References Cited in the file of this patent

UNITED STATES PATENTS

| | | |
|---|---|---|
| 2,286,759 | Patnode | June 16, 1942 |
| 2,805,473 | Handwerk et al. | Sept. 10, 1957 |
| 2,820,751 | Saller | Jan. 21, 1958 |
| 2,838,452 | West et al. | June 10, 1958 |
| 2,863,816 | Stacy | Dec. 9, 1958 |
| 2,871,558 | Colbeck | Feb. 3, 1959 |
| 2,894,893 | Carney | July 14, 1959 |
| 2,983,994 | Johnson | May 16, 1961 |
| 3,070,527 | Hurford et al. | Dec. 25, 1962 |

OTHER REFERENCES

Hausner et al.: Nuclear Fuel Elements, Nov. 24, 1959, pages 62–65, copy in group 220–C.

WAPD–MRP–67, PWR Report for Feb. 24-Apr. 23, 1957; pages 42–43.

KAPL–1770, June 1957.